US007644933B2

(12) United States Patent
Brookes et al.

(10) Patent No.: US 7,644,933 B2
(45) Date of Patent: Jan. 12, 2010

(54) VEHICLE SUSPENSION SYSTEM AND METHOD

(75) Inventors: Graham R. Brookes, Carmel, IN (US); Daniel L. Nordmeyer, Indianapolis, IN (US)

(73) Assignee: Firestone Industrial Products Company, LLC

( * ) Notice: Subject to any disclaimer, the term of this patent is extended or adjusted under 35 U.S.C. 154(b) by 527 days.

(21) Appl. No.: 11/705,916

(22) Filed: Feb. 13, 2007

(65) Prior Publication Data

US 2007/0200304 A1    Aug. 30, 2007

Related U.S. Application Data

(60) Provisional application No. 60/772,996, filed on Feb. 13, 2006.

(51) Int. Cl.
*B60G 21/067* (2006.01)
*B60G 21/073* (2006.01)

(52) U.S. Cl. .............. 280/5.502; 280/5.503; 280/5.515; 280/5.519; 280/6.158; 280/124.16

(58) Field of Classification Search .............. 280/5.501, 280/5.502, 5.503, 6.158, 5.515, 5.517–5.519, 280/124.16
See application file for complete search history.

(56) References Cited

U.S. PATENT DOCUMENTS

| 4,629,212 | A | * | 12/1986 | Takizawa et al. | ......... 280/5.519 |
| 4,730,843 | A | | 3/1988 | Tanaka et al. | |
| 5,765,115 | A | | 6/1998 | Ivan | |
| 6,217,047 | B1 | | 4/2001 | Heyring et al. | |
| 6,688,612 | B1 | | 2/2004 | Burdock et al. | |
| 7,040,632 | B2 | * | 5/2006 | Burdock et al. | ......... 280/5.515 |

FOREIGN PATENT DOCUMENTS

| DE | 197 16 719 A1 | 10/1998 |
| DE | 100 39 598 A1 | 2/2002 |
| DE | 103 29 432 A1 | 1/2005 |
| EP | 1 101 637 A | 5/2001 |
| JP | 58 218410 A | 12/1983 |
| JP | 05 085135 A | 4/1993 |
| WO | WO 03/053724 A | 7/2003 |
| WO | WO 2005/037580 A | 4/2005 |

* cited by examiner

*Primary Examiner*—Ruth Ilan
(74) *Attorney, Agent, or Firm*—Sarah M. Jabbari; Thomas R. Kingsbury; Matthew Dugan

(57) ABSTRACT

A suspension system adaptable for cross-flow operation includes a plurality of gas springs, a transfer passage in communication between the gas springs, and a transfer valve for selectively permitting gas flow along the transfer passage. A control system selectively actuates the transfer valve. A method of operation is also described.

21 Claims, 5 Drawing Sheets

VEHICLE SUSPENSION SYSTEM AND METHOD

This application claims the benefit of U.S. Provisional Patent Application No. 60/772,996, filed on Feb. 13, 2006, the disclosure of which is hereby incorporated herein by reference in its entirety.

BACKGROUND

The present novel concept broadly relates to the art of vehicle suspension systems and, more particularly, to a suspension system and method for reducing spring contribution to roll during articulated conditions of the vehicle.

Vehicle suspension systems are typically designed and constructed to include a balance of vehicle performance and ride quality or comfort. Depending upon the type and kind of vehicle upon which the suspension system is being used, this balance between performance and ride comfort may be more heavily weighted toward one condition than the other. In most cases, however, typical vehicle suspension systems are relatively well suited for operation under all normal driving conditions. For example, such conditions can include high-speed highway driving as well as traveling along a rough street or road at a relatively low speed.

Performance challenges for such typical suspension systems occur, however, under more extreme conditions. For example, a vehicle having a suspension system that is well balanced for performance and comfort is often not well suited for the very high speeds and accelerations associated with track usage. Similarly, such typical suspension systems are often not well adapted for conditions requiring large suspension travel, such as traversing off-road terrain, for example. Additionally, vehicle suspension systems that are well suited for either of such extreme performance conditions often do not provide a suitable balance of comfort and performance under normal driving conditions.

To overcome these and other issues and difficulties, vehicle suspension systems have been developed that provided balanced performance and ride comfort under normal driving conditions, but which are adaptable for use under conditions in which substantial wheel or axle articulation occurs. However, certain disadvantages exist with such known adaptable vehicle suspension systems, and these disadvantages can act to limit the application and use of such known adaptable vehicle suspension systems.

One example of such an adaptable vehicle suspension system is shown and described in U.S. Pat. No. 6,217,047 to Heyring et al. More specifically, the Heyring patent discloses a passive vehicle suspension system for providing a high level of roll control while also providing minimal stiffness to cross-axle articulation motions. Another example of such an adaptable vehicle suspension system is shown and described in U.S. Pat. No. 5,765,115 to Ivan. The Ivan patent discloses a vehicle suspension system that includes valves connected between air springs, which valves are open under normal operating conditions but which are automatically closed by the control system in Ivan to increase the effective spring rate under certain conditions. Still another adaptive vehicle suspension system is shown and described in U.S. Pat. No. 6,688,612 to Burdock, et al. Though operating on substantially opposite principles to that of the Ivan patent, the Burdock patent is also directed to an adaptive vehicle suspension system. However, the system in the Burdock patent includes valves that are closed under normal driving conditions, but which valves are automatically opened by the control system to permit increased articulation of the suspension system.

While the foregoing documents are directed to significantly different inventions, one common disadvantage of such known systems is that the same provided for little, if any, manual control over the operation of the system. That is, in some application and/or conditions of use, it may be desirable to provide the operator with the ability to selectively activate and de-activate the cross-linking features of the suspension system. However, such known suspensions systems, which utilize either passive or fully automatic systems, provide an operator with little or no control of the system.

Accordingly, an adaptable vehicle suspension system and method of operating the same that overcomes these and other difficulties and disadvantages is believed desirable.

BRIEF SUMMARY

One exemplary embodiment of a suspension system in accordance with the present novel concept for an associated vehicle capable of undergoing a vehicle articulation condition is provided that includes first and second gas springs. A gas transfer passage is in fluid communication with the first and second gas springs, and a first valve assembly is operatively disposed along the gas transfer passage for selectively permitting gas transfer between the first and second gas springs. A pressurized gas source is in communication with at least one of the first and second gas springs. A second valve assembly is fluidically disposed between the pressurized gas source and at least one of the first and second gas springs. The second valve assembly selectively permits gas transfer between the pressurized gas source and at least one of the first and second gas springs. A control system is in operative association with at least the first and second valve assemblies. The control system includes a user input device capable of generating user-inputted signals in response to associated user inputs, and a control unit in communication with at least the first valve assembly. The control unit is adapted to receive a first user-inputted signal from the user input device and actuate the first valve assembly in response to the first user-inputted signal to place the first valve assembly into an open condition and thereby permit gas flow along the gas transfer passage and between the first and second gas springs. The control unit is also adapted to receive a second user-inputted signal from the user input device and actuate the first valve assembly in response to the second user-inputted signal to place the first valve assembly into a closed condition and thereby prevent gas flow along the gas transfer passage and between the first and second gas springs.

Another exemplary embodiment of a suspension system in accordance with the present novel concept for an associated vehicle having opposing vehicle sides is provided that includes a first gas spring supported along one of the opposing vehicle sides and a second gas spring supported on the other of the opposing vehicle sides. A gas transfer passage extends between the first and second gas springs, and a valve assembly is operatively disposed along the gas transfer passage. A control system is in communication with the valve assembly and includes a user input device operative to generate an input signal corresponding to an associated user input. The control system also includes a controller in communication with the user input device and operable to selectively actuate the valve assembly in response to the input signal and thereby selectively effect cross-flow operation of the suspension system.

One exemplary embodiment of a method of operating a suspension system of an associate vehicle that is capable of cross-flow operation is provided in accordance with the present novel concept and includes providing a suspension system. The suspension system includes first and second gas springs, a gas transfer passage in communication with the first and second gas springs, a valve assembly operatively disposed along the gas transfer passage, and a control system including a user input device and a control unit in communication with the user input device and the valve assembly. The user input device operative to generate user-inputted signal for activating and de-activating cross-flow operation of the suspension system. The control unit operative to receive the user-inputted signals and selectively control the valve assembly based at least in part on the user-inputted signals. The method also includes receiving a first user-inputted signal from the user input device, and placing the valve assembly into an open condition and thereby permitting gas flow along the gas passage between the first and second gas springs. The method further includes receiving a second user-inputted signal from the user input device, and placing the valve assembly into a closed condition and thereby restricting gas flow along the gas passage between the first and second gas springs.

DETAILED DESCRIPTION

Figure 1:
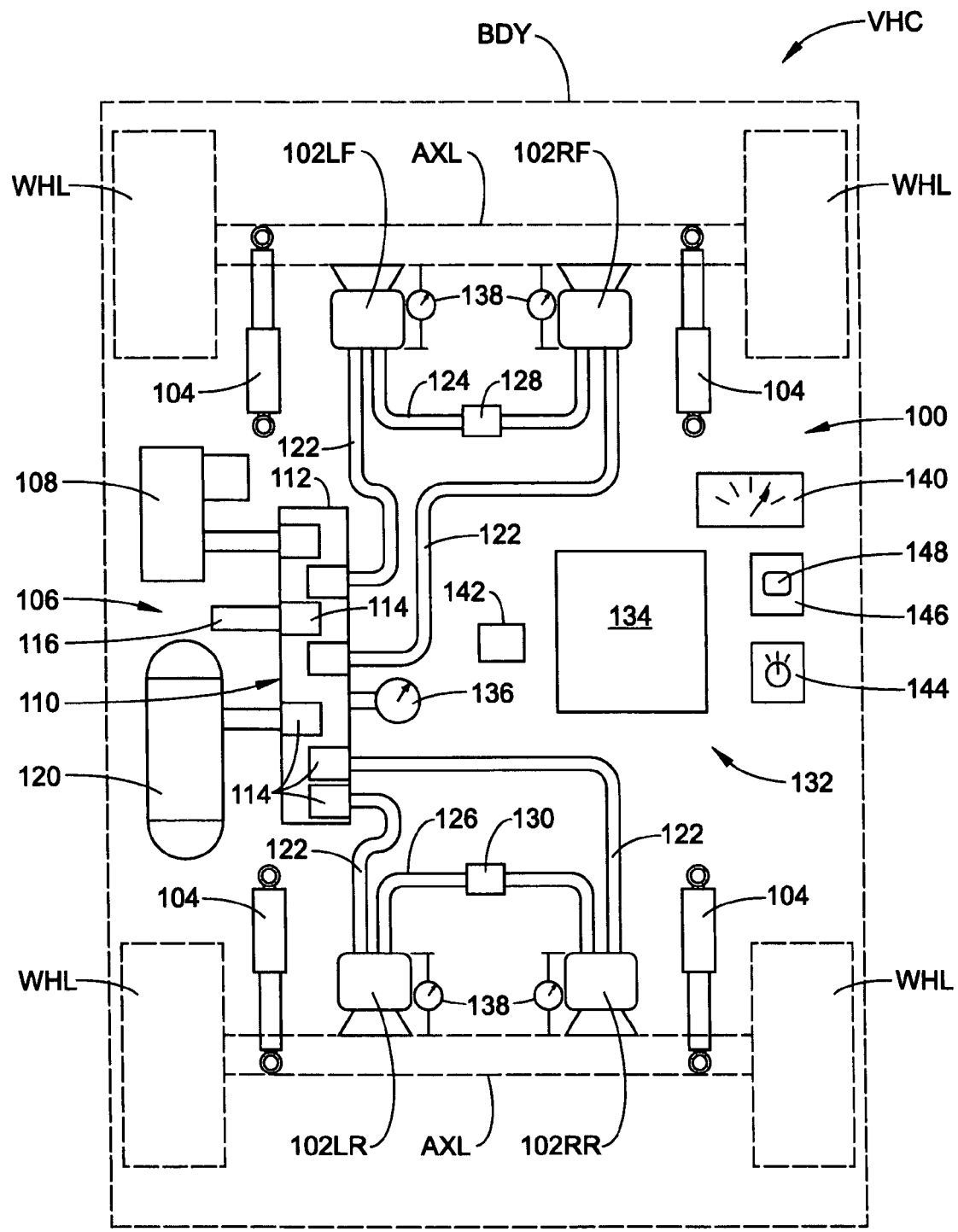
FIG. 1 is schematic representation of one exemplary embodiment of a vehicle suspension system in accordance with the present novel concept.

Referring now in greater detail to the drawings, wherein the showings are for the purposes of illustrating preferred embodiments of the subject novel concept only, and not for the purpose of limiting the same, FIG. 1 illustrates a vehicle VHC having a sprung mass, such as a body BDY, for example, supported on an unsprung mass, such as axles AXL and wheels WHL, for example. Using conventional reference characters, it will be recognized that vehicle VHC has opposing left (L) and right (R) sides, and opposing front (F) and rear (R) ends. Thus, the four corners of the vehicle can be referenced as LF, LR, RF and RR for left front, left rear, right front and right rear, respectively, and such notation will be used hereinafter with reference to specific components.

A suspension system 100 is operatively associated with vehicle VHC and includes a plurality of gas springs 102 supported between the sprung and unsprung masses of the vehicle at the corresponding corners thereof. Suspension system 100 also includes a plurality of damping members 104 supported between the sprung and unsprung masses of the vehicle. In the exemplary embodiment shown, gas springs 102LF, 102LR, 102RF and 102RR and damping members 104 are disposed adjacent wheels WHL. However, it will be appreciated that any suitable construction and/or configuration can alternately be used.

Suspension system 100 also includes a pressurized gas supply system 106 operatively associated with gas springs 102 for supplying pressurized gas thereto and transferring pressurized gas therefrom. In the exemplary embodiment shown in FIG. 1, gas supply system 106 includes a pressurized gas source, such as a compressor 108, for example, for generating pressurized air or other gases. A control device, such as a valve assembly 110, for example, is shown as being in fluid communication with compressor 108 and can be of any suitable configuration or arrangement. In the exemplary embodiment shown, valve assembly 110 includes a valve block 112 with a plurality of valves (not shown) supported on the valve block and with corresponding valve actuators 114 for selectively opening and closing the valves. Valve assembly 110 can also include a suitable exhaust, such as a muffler 116, for example, for venting pressurized gas from the system. Optionally, pressurized gas supply system 106 can also include a reservoir 120 in fluid communication with valve assembly 110 and suitable for storing pressurized gas.

Valve assembly 110 is in communication with gas springs 102 through gas transmission lines 122. As such, pressurized gas can be selectively transmitted to and/or from the gas springs through valve assembly 110, such as to alter or maintain vehicle height at one or more corners of the vehicle, for example. Additionally, under certain operating conditions it may be desirable to transfer pressurized gas between two gas springs, such as gas springs 102LF and 102RF, for example. One option for transferring pressurized gas between the gas springs would be to vent pressurized gas from one spring and supply an approximately equivalent volume of pressurized air to the other spring. Such indirect transfers, however, typically are not sufficiently responsive to provide the desired suspension system performance.

As an alternative, increased responsiveness and greater suspension system performance can be achieved by utilizing dedicated transfer lines that can provide direct fluid communication between two gas springs. For example, in the present exemplary embodiment, suspension system 100 includes a gas transfer line 124 extending between gas springs 102LF and 102RF, and a gas transfer line 126 extending between gas springs 102LR and 102RR. Additionally, transfer valves 128 and 130 are operatively disposed along gas transfer lines 124 and 126, respectively. Transfer valves 128 and 130 are operative to selectively permit gas transfer through and/or along the respective transfer lines.

Figure 2:
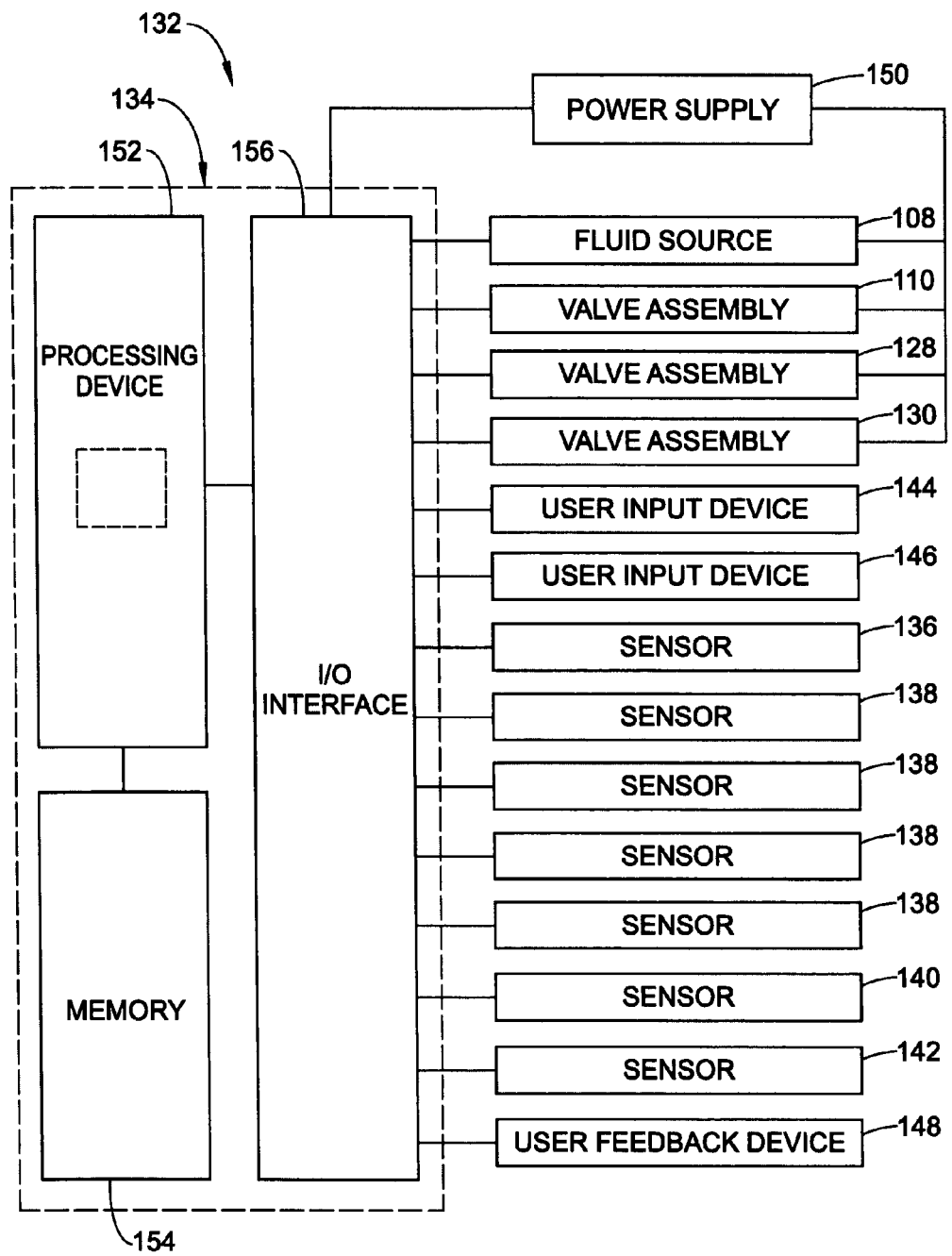
FIG. 2 is a schematic representation of one exemplary embodiment of a control system for the vehicle suspension system in FIG. 1.

As shown in FIGS. 1 and 2, suspension system 100 also includes a control system 132 in communication with various other systems and components of the suspension system for selective operation and control thereof. Control system 132 includes a controller or control unit 134 in communication with a pressurized gas source, such as compressor 108, for example, and a control device, such as valve assembly 110, for example, for selective operation and control thereof, including supplying and venting pressurized gas to and from gas springs 102. A pressure sensor 136 can optionally be provided in operative association with valve assembly 110. The pressure sensor is in communication with controller 134 and outputs signals thereto indicative of a pressure in one or more of the components of the gas supply system, such as reservoir 120, for example, or of the suspension system, such as gas springs 102, for example. Additionally, height sensors 138 can be operatively associated with gas springs 102 for outputting signals indicative of the height of the gas spring or the distance between components of the vehicle. Height sensors 138 are in communication with controller 134, which receives the height or distance signals. It will be appreciated that height sensors 138 can be of any suitable type, kind or construction, such as mechanical linkage sensors, ultrasonic wave-type sensors or electromagnetic wave-type sensors, for example.

A speed sensing device 140 is in communication with controller 134 and is operative to output signals indicative of the speed of the vehicle. Additionally, a slope, tilt or orientation sensor 142, such as a multi-axis accelerometer, for example, is in communication with controller 134 and is operative to output signals indicative of the slope, tilt or orientation of the vehicle. Commonly, vehicle suspension systems include or are adapted for automatic level or height control to position and/or maintain the vehicle body at a predetermined height or orientation. As such, a user input device 144, such as a height selection switch or touch-screen input device, for example, can optionally be included for providing user input and/or selection regarding the vehicle height or orientation.

Controller 134 is in communication with transfer valves 128 and 130 for selective activation and/or operation thereof. A user input device 146, such as a button, switch or touch-screen input device, for example, is in communication with controller 134 and transmits or otherwise communicates a user-inputted activation or deactivation signal thereto. During various modes of operation of suspension system 100, it may be desirable to provide the user or operator with feedback of some type or kind. As such, a user feedback device 148, such as a lamp or touch-screen display device, for example, can optionally be provided in communication with controller 134. Control system 132 can also include or be operatively associated with a suitable power source 150 (FIG. 2) for providing electrical power to controller 134 as well as to one or more of the compressor, the valve assemblies, the sensors and/or the user input and feedback devices.

Controller 134 can be of any suitable type, kind or construction. In the exemplary embodiment shown in FIG. 2, controller 134 includes a processing device 152, such as a microprocessor, microcomputer or microcontroller, for example. A memory 154 is in communication with processing device 152 and is suitable for receiving and storing data and/or algorithms for control and operation of vehicle suspension system 100. A input/output device or interface 156 is in communication with processing device 152 and is suitable for interfacing with components and devices of suspension system 100 and optionally with other vehicle systems (not shown) and components (not shown) as well.

Figure 3:
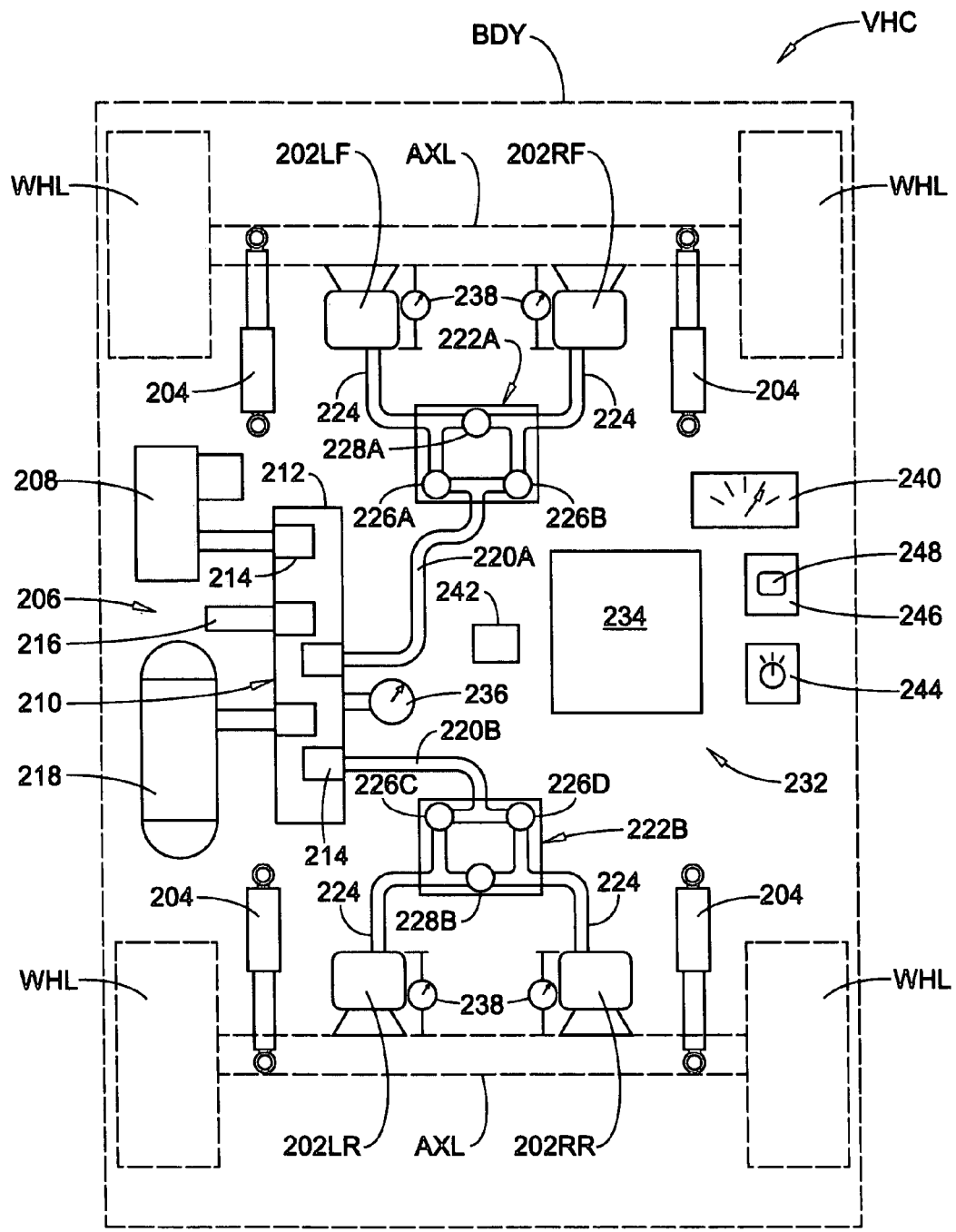
FIG. 3 is a schematic representation of another exemplary embodiment of a vehicle suspension system in accordance with the present novel concept.

Another exemplary embodiment of a vehicle suspension system 200 in accordance with the present novel concept is shown in FIG. 3. It will be appreciated that suspension system 200 is similar to suspension system 100 shown in and described with regard to FIGS. 1 and 2, and is operatively associated with vehicle VHC in a similar manner. Suspension system 200 includes a plurality of gas springs 202LF, 202RF, 202LR, 202RR operatively disposed between an unsprung mass of the vehicle, such as an axle AXL or wheel WHL, for example, and a sprung mass of the vehicle, such as a body BDY, for example. Damping members 204 are also supported between the sprung and unsprung masses adjacent the gas springs.

Suspension system 200 includes a pressurized gas supply system 206 operatively associated with gas springs 202 for supplying pressurized gas thereto and transferring pressurized gas therefrom. In the exemplary embodiment shown, pressurized gas supply system 206 includes a pressurized gas source, such as a compressor 208, for example. A control device, such as a valve assembly 210, for example, is shown in fluid communication with compressor 208 and includes a valve block 212 and valve actuators 214 operatively associated with a plurality of valves (not shown). A muffler 216 or other suitable device can be included for venting pressurized gas from the system. Optionally, pressurized gas supply system 206 can also include a reservoir 218 for storing pressurized gas.

Suspension system 200 includes gas lines 220A and 220B that extend from valve assembly 210 and communicate with valve assemblies 222A and 222B, which are operatively associated with the front and rear gas springs, respectively. Gas lines 224 extend between valve assemblies 222 and gas springs 202. Valve assemblies 222 include distribution valves 226 as well as a cross-linking valves 228. Valve assemblies 222A and 222B can be of any suitable type, kind or configuration. Though shown in FIG. 3 as circles of approximately equal size, cross-linking valves 228 are, in one exemplary embodiment, significantly larger than distribution valves 226. This helps to ensure that a sufficient volume of air can flow between the associated gas springs.

In operation, valve assembly 210 can transfer gas to and from gas springs 202LF and 202RF by way of gas line 220A and valve assembly 222A, which can be selectively operated to permit or restrict flow to the left front and right front gas springs through distribution valves 226A and 226B, respectively. Gas transfer between the front gas springs is provided by selective operation of cross-linking valve 228A. Valve assembly 210 can transfer gas to and from gas springs 202LR and 202RR using gas line 220B and valve assembly 222B. Similar to valve assembly 222A, valve assembly 222B can be selectively operated to permit or restrict flow to the left rear and right rear gas springs through distribution valves 226C and 226D, respectively. Gas transfer between the front gas springs is provided by selective operation of cross-linking valve 228B.

Similar to suspension system 100 shown in FIGS. 1 and 2, suspension system 200 also includes a control system 232 in communication with various components and systems of the vehicle. Control system 232 includes a control unit or controller 234 in communication with compressor 208 and valve assembly 210 for selective operation and control thereof for supplying and exhausting pressurized gas to and from gas springs 202. Additionally controller 234 is in communication with valve assemblies 222A and 222B and is operative to selectively control the distribution and cross-linking valves thereof.

A pressure sensor 236 is operatively associated with valve assembly 210 and outputs signals to controller 234 indicative of a pressure in one or more of the gas springs and/or other suspension system components. Height sensors 238 are operatively associated with gas springs 202 for outputting to controller 234 signals indicative of the height of a gas spring or a distance between components of the vehicle. A speed sensing device 240 is in communication with controller 234 and is operative to output signals indicative of the speed of the vehicle. A slope, tilt or orientation sensor 242, such as a multi-axis accelerometer, for example, is in communication with controller 234 and is operative to output signals thereto that are indicative of the slope, tilt or orientation of the vehicle. A first user input device 244, such as a selector switch, for example, can be provided in communication with controller 234 for generating a signal indicative of a user input or selection. Additionally, a second user input device 246, such as a button, switch or touch-screen input device, for example, can be provided in communication with controller 234. A user feedback device 248 can be provided separately or in combination with another component.

Figure 4:
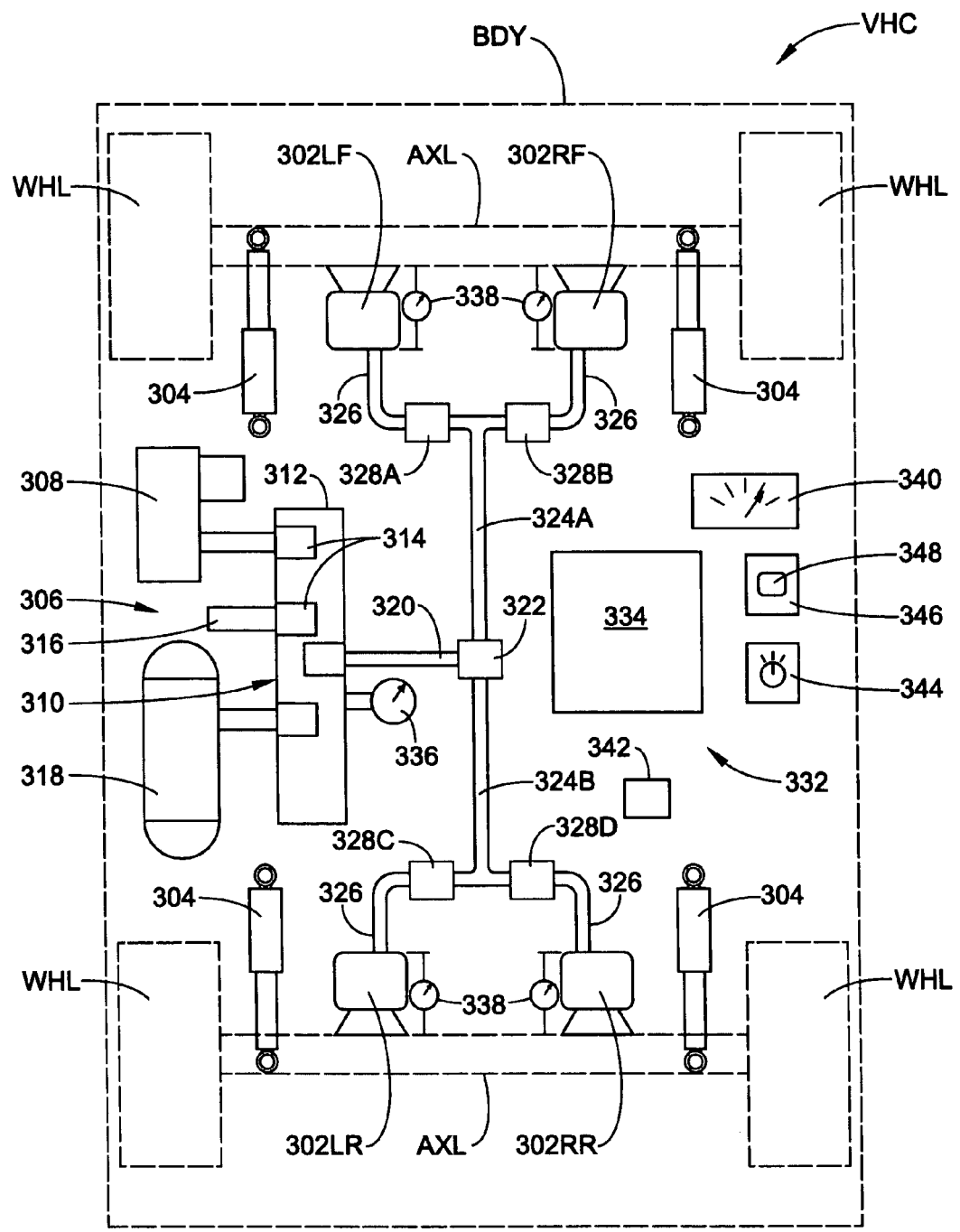
FIG. 4 is a schematic representation of still another exemplary embodiment of a vehicle suspension system in accordance with the present novel concept.

Another exemplary embodiment of a vehicle suspension system 300 in accordance with the present novel concept is shown in FIG. 4. It will be appreciated that suspension system 300 is similar to suspension system 100 shown in and described with regard to FIGS. 1 and 2, and is operatively associated with vehicle VHC in a similar manner. Suspension system 300 includes a plurality of gas springs 302LF, 302RF, 302LR, 302RR operatively disposed between an unsprung mass of the vehicle, such as an axle AXL or wheel WHL, for example, and a sprung mass of the vehicle, such as a body BDY, for example. Damping members 304 are also supported between the sprung and unsprung masses adjacent the gas springs.

Suspension system 300 includes a pressurized gas supply system 306 operatively associated with gas springs 302 for supplying pressurized gas thereto and transferring pressurized gas therefrom. In the exemplary embodiment shown, pressurized gas supply system 306 includes a pressurized gas source, such as a compressor 308, for example. A control device, such as a valve assembly 310, for example, is shown in fluid communication with compressor 308 and includes a valve block 312 and valve actuators 314 operatively associated with a plurality of valves (not shown). A muffler 316 or other suitable device can be included for venting pressurized gas from the system. Optionally, pressurized gas supply system 306 can also include a reservoir 318 for storing pressurized gas.

Suspension system 300 includes a gas line 320 that extends from valve assembly 310 and communicates with a valve assembly 322. Gas lines 324A and 324B extend from valve assembly 322 and are operative to transfer pressurized gas to and from the front and rear gas springs, respectively. Gas lines 326 are in communication with gas springs 302 and gas lines 324. Valve assemblies 328 are disposed along gas lines 326 and are selectively operable to transfer pressurized gas to and from the gas springs. Valve assemblies 322 and 328 can be of any suitable type, kind or configuration. In one exemplary embodiment, however, valve assemblies 328 include variable orifice valves that can be operated at two or more flow rates. In such an arrangement, a larger orifice can be used for cross-flow operation and a smaller orifice can be used for height control and/or leveling operations, for example. The use of a larger orifice for cross-linking can be helpful to ensure that a sufficient volume of air can flow between the associated gas springs, whereas the smaller orifice can be used to provide greater flow control for height change, leveling and other operations.

In operation, valve assembly 310 can be placed in fluid communication with gas lines 324A and 324B through gas line 320 by selective operation of valve assembly 322. Pressurized gas can be transported to and from gas springs 302LF and 302RF by way of gas line 324A and gas lines 326 through selective operation of valve assemblies 328A and 328B. Gas transfer between the front gas springs is provided by closing valve assembly 322 and opening valve assemblies 328A and 328B. Additionally, pressurized gas can be transported to and from gas springs 302LR and 302RR by way of gas line 324B and gas lines 326 through selective operation of valve assemblies 328C and 328D. Gas transfer between the rear gas springs is provided by closing valve assembly 322 and opening valve assemblies 328C and 328D. During cross-linked operation, valve assembly 322 is closed to prevent communication between the front and rear gas springs of the vehicle. As a result, both valve assemblies 328A and 328B as well as valve assemblies 328C and 328D can be open to thereby permit cross-articulation of the vehicle suspension system.

Similar to suspension system 100 shown in FIGS. 1 and 2, suspension system 300 also includes a control system 332 in communication with various components and systems of the vehicle. Control system 332 includes a control unit or controller 334 in communication with compressor 308 and valve assembly 310 for selective operation and control thereof for supplying and exhausting pressurized gas to and from gas springs 302. Additionally controller 334 is in communication with valve assemblies 322 and 328A-D and is operative to selectively control actuation thereof.

A pressure sensor 336 is operatively associated with valve assembly 310 and outputs signals to controller 334 indicative of a pressure in one or more of the gas springs and/or other suspension system components. Height sensors 338 are operatively associated with gas springs 302 for outputting to controller 334 signals indicative of the height of a gas spring or a distance between components of the vehicle. A speed sensing device 340 is in communication with controller 334 and is operative to output signals indicative of the speed of the vehicle. A slope, tilt or orientation sensor 342, such as a multi-axis accelerometer, for example, is in communication with controller 334 and is operative to output signals thereto that are indicative of the slope, tilt or orientation of the vehicle. A first user input device 344, such as a selector switch, for example, can be provided in communication with controller 334 for generating a signal indicative of a user input or selection. Additionally, a second user input device 346, such as a button, switch or touch-screen input device, for example, can be provided in communication with controller 334. A user feedback device 348 can be provided separately or in combination with another component.

Figure 5:
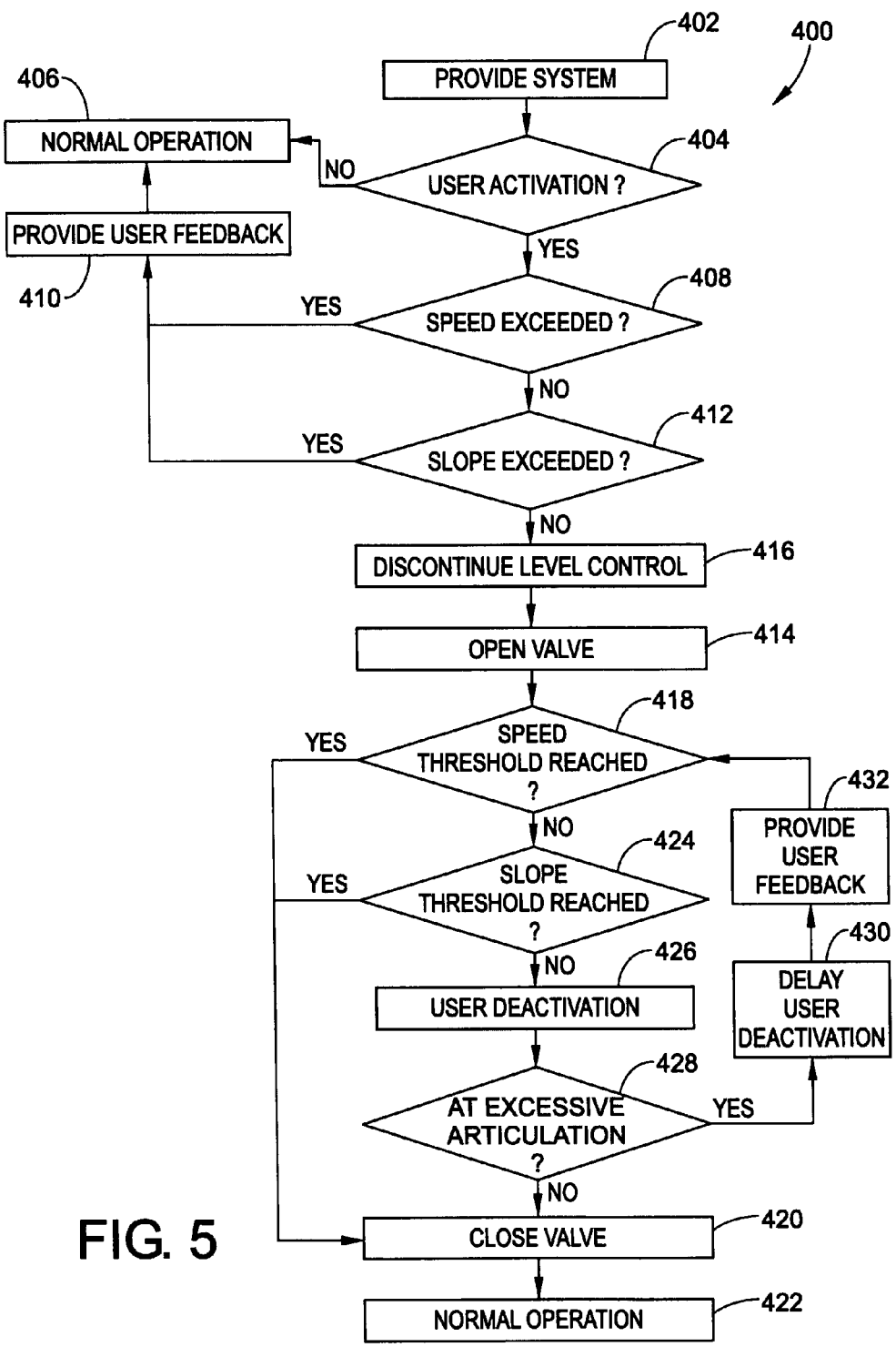
FIG. 5 is one exemplary diagrammatic representation of a method of operating a vehicle suspension system in accordance with the present novel concept.

FIG. 5 illustrates one exemplary representation of a method 400 of operating an adaptable vehicle suspension system, such as vehicle suspension system 100, 200 or 300, for example. Method 400 includes providing an adaptable vehicle suspension system, such as suspension system 100, 200 or 300, as indicated by box 402. At decision box 404, a determination is made as to whether the user or operator has activated the cross-flow operation of the suspension system, such as by performing an input action (e.g., depressing a button or touching an area of a touch-screen) on user input device 146, 246 or 346, for example. If no activation signal has been received, a NO determination is made at decision box 404 and the vehicle suspension system operates in a normal mode, as indicated by box 406. If an activation signal has been received, a YES determination is made at decision box 404 and decision box 408 is reached, at which a determination is made as to whether the operating speed of the vehicle exceeds a predetermined threshold value above which entry into cross-flow operation is not permitted. If a YES determination is reached, cross-flow operation is not initiated and the vehicle suspension system operates in a normal mode, as indicated by box 406. Optionally, user feedback can be provided to indicated to the user or operator that cross-flow operation has not been initiated, as indicated by box 410. Optionally, different indicia or signals (e.g., different flashing light patterns) could be used to indicate to the operator or user which of the one or more conditions for cross-flow operation has not been met.

If the vehicle speed is at or below the predetermined threshold value, a NO determination is made as decision box 408 and decision box 412 is reached, at which a determination is made as to whether the orientation of the vehicle exceeds a predetermined threshold value above which entry into cross-flow operation is not permitted. If a YES determination is made, cross-flow operation is not initiated and the vehicle system operates in normal mode, as indicated by box 406. Optionally, user feedback can be provided, as mentioned above, as indicated by box 410. If a NO determination is made at decision box 412, one or more control devices, such as transfer valves 128 and 130 in FIGS. 1 and 2, transfer valve assemblies 228A and 228B in FIG. 3, or transfer valve assemblies 328A-D in FIG. 4, for example, can be opened, as indicated by box 414. Optionally, any automatic leveling operations or operational modes can be suspended or otherwise discontinued prior to opening the transfer valves, as indicated by box 416.

Once the transfer valves are opened, the suspension control system, such as control system 132, 232 or 332, for example, preferably monitors various vehicle input conditions (e.g., speed, orientation, acceleration) or other parameters to determine whether cross-flow operation should be discontinued. One example of such monitoring is indicated by decision box 418 at which an inquiry is made as to whether the vehicle has attained a speed that exceeds a predetermined threshold value. If a YES determination is made, cross-flow operation is discontinued by closing the transfer valve or valves, as indicated by box 420. Thereafter, normal operation of the vehicle suspension system occurs, as indicated by box 422.

If the vehicle has not attained a speed that exceeds the predetermined threshold value, a NO determination is made and decision box 424 is reached, at which an inquiry is made as to whether the vehicle has reached an orientation, slope or tilt that exceeds a predetermined threshold value. If a YES determination is reached, cross-flow operation is discontinued by closing the transfer valve or valves, as indicated by box 420, and normal suspension system operation occurs, as indicated by box 422. If the vehicle has not reached an orientation, slope or tilt that exceeds the predetermined threshold value, a NO determination is made at decision box 424. It will be appreciated that other inputs and parameters can additionally or alternately be monitored in a similar manner, and that the monitored input conditions shown and described are merely exemplary.

Monitoring of the vehicle inputs and conditions can be performed continuously or at any suitable intervals. At a time at which it is desirable for cross-flow operation to be discontinued, the user or operator can generate a deactivation signal, such as by performing an input action (e.g., depressing a button or touching an area of a touch-screen) on user input device 146, 246 or 346, for example. Such an action or operation is indicated by box 426. Upon receiving such a deactivation signal, a determination is made a decision box 428 as to whether the vehicle is undergoing a suspension articulation that exceeds a predetermined threshold value. If a NO determination is made, the transfer valve or valves are closed, as indicated by box 420, and the vehicle suspension system returns to normal operation, as indicated by box 422. If the vehicle is undergoing a suspension articulation that exceeds a predetermined threshold value, a YES determination is made and the user-inputted deactivation signal can be disregarded. Alternatively, the user-inputted deactivation signal can be stored in a suitable manner, such as in memory 154, for example, and deactivation of the cross-linking operation can be delayed, as indicated by box 430, until the level of articulation has reached a predetermined threshold value. During such a delay, the control system returns to monitoring the input conditions and parameters. Optionally, user feedback can be provided, as mentioned above, as indicated by box 432.

As used herein with reference to certain elements, components and/or structures (e.g., "first gas spring" and "second gas spring"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

What is claimed is:

1. A suspension system for an associated vehicle capable of undergoing a vehicle articulation condition, said suspension system comprising:
   first and second gas springs;
   a gas transfer passage in fluid communication with said first and second gas springs;
   a first valve assembly operatively disposed along said gas transfer passage for selectively permitting gas transfer between said first and second gas springs;
   a pressurized gas source in communication with at least one of said first and second gas springs;
   a second valve assembly fluidically disposed between said pressurized gas source and said at least one of said first and second gas springs, said second valve assembly selectively permitting gas transfer between said pressurized gas source and said at least one of said first and second gas springs; and,
   a control system in operative association with at least said first and second valve assemblies, said control system including a first height sensor operatively associated with said first gas spring and adapted to generate a first height signal having a relation to a first distance associated with said first gas spring, a second height sensor operatively associated with said second gas spring and adapted to generate a second height signal having a relation to a second distance associated with said second gas spring, a user input device capable of generating user-inputted signals in response to associated user inputs, and a control unit in communication with at least said first valve assembly, said first and second height sensors in communication with said control unit, and said control unit adapted to:
   receive a first user-inputted signal from said user input device;
   actuate said first valve assembly in response to said first user-inputted signal to place said first valve assembly into an open condition and thereby permit gas flow along said gas transfer passage and between said first and second gas springs;
   receive a second user-inputted signal from said user input device; and actuate said first valve assembly in response to said second user-inputted signal to place said first valve assembly into a closed condition and thereby prevent gas flow along said gas transfer passage and between said first and second gas springs;
   receive said first and second height signals;

determine whether the associated vehicle is undergoing a vehicle articulation condition that exceeds a predetermined articulation threshold value based at least in part on said first and second height signals; and, upon determining that the vehicle articulation condition is one of less than and approximately equal to said predetermined articulation threshold value, actuate said first valve assembly to place said first valve assembly into said closed condition; and, upon determining that the vehicle articulation condition exceeds said predetermined articulation threshold value, one of ignore said second user-inputted signal and delay actuation of said first valve assembly to place said valve assembly into said closed condition until the vehicle articulation condition is one of less than and approximately equal to said predetermined articulation threshold value.

2. A suspension system according to claim 1, wherein said control unit includes a memory storing at least one of said predetermined articulation threshold value or said second user-inputted signal for delaying actuation of said first valve assembly.

3. A suspension system for an associated vehicle having opposing vehicle sides, said suspension system comprising:
a first gas spring supported on one of the opposing vehicle sides;
a second gas spring supported on the other of the opposing vehicle sides;
a gas transfer passage extending between said first and second gas springs;
a valve assembly operatively disposed along said gas transfer passage; and,
a control system in communication with said valve assembly, said control system including:
a user input device operative to generate an input signal corresponding to an associated user input;
a controller in communication with said user input device and operable to selectively actuate said valve assembly in response to said input signal thereby selectively effecting cross-flow operation of said suspension system; and
first and second height sensors in communication with said controller, said first height sensor operatively associated with said first gas spring for determining a first height and said second height sensor operatively associated with said second gas spring for determining a second height;
said controller being adapted to ignore an input signal from said user input device if said difference between said first and second heights is greater than a predetermined value.

4. A suspension system according to claim 3 further comprising a tilt sensor in communication with said controller, said tilt sensor operative to output a tilt sensor signal indicative of an orientation of the associate vehicle, and said controller is operative to determine if said tilt sensor signal exceeds a predetermined threshold value.

5. A suspension system according to claim 3 further comprising a speed sensor in communication with said controller, said speed sensor operative to output a speed sensor signal indicative of a speed of the associated vehicle, and said controller is operative to determine if said speed sensor signal exceeds a predetermined threshold value.

6. A suspension system according to claim 3, wherein said controller is operative to maintain the associated vehicle at a predetermined height, and said control system includes a height select switch in communication with said controller and operative to output a height select signal indicative of said predetermined height to said controller.

7. A suspension system according to claim 3, wherein said valve assembly includes a size-variable orifice, said controller is adapted to selectively maintain the associated vehicle at a predetermined height, and said controller is adapted to selectively vary said size-variable orifice between at least a first size for use during cross-flow operation and a second size for use in maintaining the associated vehicle at said predetermined height.

8. A method of operating a suspension system of a vehicle that is capable of cross-flow operation, said method comprising:
a) providing a suspension system including first and second gas springs, a gas transfer passage in communication with said first and second gas springs, a valve assembly operatively disposed along said gas transfer passage and capable of selectively controlling gas flow therethrough, and a control system including a user input device and a control unit in communication with said user input device and said valve assembly, said user input device operative to generate user-inputted signals for activating and de-activating cross-flow operation of said suspension system, and said control unit operative to receive said user-inputted signals and selectively control said valve assembly based at least in part on said user-inputted signals;
b) receiving a first user-inputted signal from said user input device;
c) placing said valve assembly into an open condition and thereby permitting gas flow along said gas passage between said first and second gas springs;
receiving a second user-inputted signal from said user input device;
d) receiving a second user-inputted signal from said user input device;
e) determining whether the vehicle is undergoing a suspension articulation that exceeds a predetermined articulation threshold value; and,
f) placing said valve assembly into a closed condition and thereby restricting gas flow along said gas passage between said first and second gas springs;
whereby upon determining in e) that the suspension articulation is one of less than and approximately equal to said predetermined articulation threshold value, said method includes proceeding with performance of f); and,
whereby upon determining in e) that the suspension articulation exceeds said predetermined articulation threshold value, one of ignoring said second user-inputted signal and delaying performance of f) until the suspension articulation is one of less than and approximately equal to said predetermined articulation threshold value.

9. A method according to claim 8 further comprising:
upon one of ignoring said second user-inputted signal and delaying performance of e), providing to the user feedback indicative of the suspension system remaining in cross-flow operation.

10. A method according to claim 8, wherein delaying performance of e) includes storing said second user-inputted signal and retrieving said second user-inputted signal after the suspension articulation is one of less than and approximately equal to said predetermined articulation threshold value.

11. A method according to claim 8 further comprising determining if an input condition of the associated vehicle exceeds a predetermined threshold value prior to placing said valve assembly into an open condition in c).

12. A method according to claim 11, wherein said input condition is vehicle speed and said predetermined threshold value is a speed value.

13. A method according to claim 11, wherein said input condition is vehicle orientation and said predetermined threshold value is a slope value.

14. A method according to claim 8 further comprising determining if an input condition of the associated vehicle exceeds a predetermined threshold value after placing said valve assembly into an open condition in c).

15. A method according to claim 8 further comprising determining if an input condition of the associated vehicle exceeds a predetermined threshold value after receiving said user-inputted deactivation signal in d).

16. A method according to claim 15, wherein said predetermined threshold value is exceeded and said method further includes retaining said valve assembly in said open condition.

17. A method according to claim 16, wherein said method further includes providing user feedback indicative of retaining said valve assembly in said open condition.

18. A suspension system operatively disposed between an associated sprung mass and an associate unsprung mass of an associated vehicle that has left and right vehicle sides and front and rear vehicle ends, said suspension system comprising:
- a first gas spring operatively connected between the associated sprung and unsprung masses toward a left front corner of the associated vehicle;
- a second gas spring operatively connected between the associated sprung and unsprung masses toward a right front corner of the associated vehicle;
  - a third gas spring operatively connected between the associated sprung and unsprung masses toward a left rear corner of the associated vehicle;
  - a fourth gas spring operatively connected between the associated sprung and unsprung masses toward a right rear corner of the associated vehicle;
- a first gas transfer passage extending between said first and second gas springs;
  - a second gas transfer passage extending between said third and fourth gas springs;
- a first gas control device fluidically connected along said first gas transfer passage and selectively operable to fluidically interconnect said first and second gas springs;
  - a second gas control device fluidically connected along said second gas transfer passage and selectively operable to fluidically interconnect said third and fourth gas springs; and,
- a control system in communication with said first gas control device and operative to at least selectively operate said first gas control device in response to one or more signals generated in relation to an associated user input acting on a user input device, such that an associated user can thereby selectively permit fluid communication between said first and second gas springs by way of said first gas transfer passage; and,
- said control system in communication with said second gas control device and operative to at least selectively operate said second gas control device in response to said one or more signals generated in relation to the associated user input acting on said user input device, such that the associated user can thereby selectively permit fluid communication between said third and fourth gas springs by way of said second gas transfer passage.

19. A suspension system according to claim 18, wherein said user input device is one of a button, a switch and a touch-screen interface.

20. A suspension system according to claim 18, wherein said control system includes at least one controller in communication between said user input device and said first and second gas control devices.

21. A suspension system according to claim 20, wherein said at least one controller includes a single control unit in communication with each of said user input device and said first and second gas control devices.

* * * * *